UNITED STATES PATENT OFFICE.

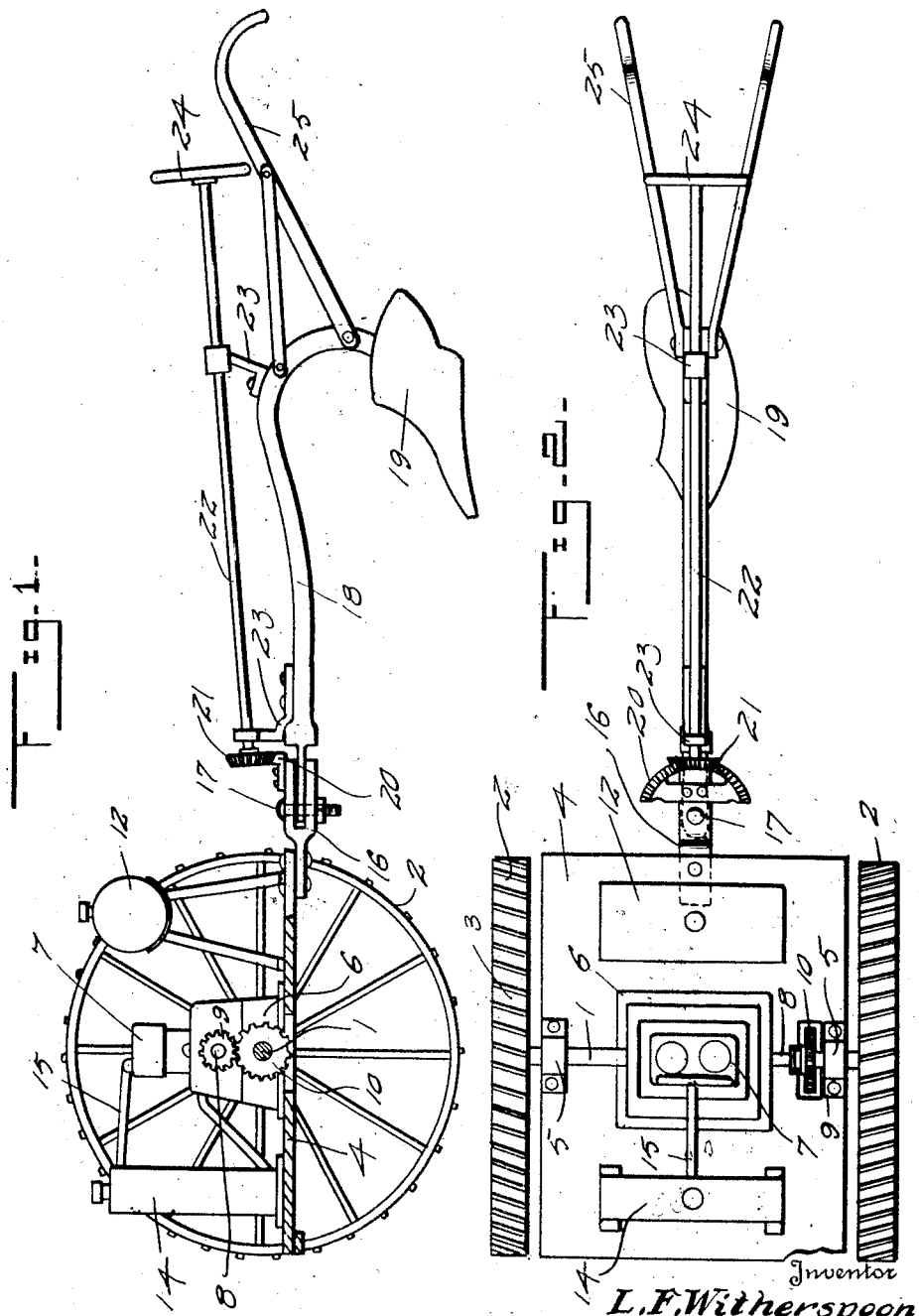

LOUSINDY F. WITHERSPOON, OF DILL, OKLAHOMA.

MOTOR-PLOW.

1,322,988.     Specification of Letters Patent.     Patented Nov. 25, 1919.

Application filed June 1, 1917. Serial No. 172,246.

*To all whom it may concern:*

Be it known that I, LOUSINDY F. WITHERSPOON, a citizen of the United States, residing at Dill, in the county of Washita and State of Oklahoma, have invented certain new and useful Improvements in Motor-Plows; and I do hereby declare the following to be a full, clear, and exact description of the invention, such as will enable others skilled in the art to which it appertains to make and use the same.

This invention relates to agricultural implements, and the primary object of the invention is to provide a motor propelled structure or tractor for drawing turning plows, cultivators or analogous agricultural implements, and the primary object of the invention is to provide a comparatively cheap, efficient and light two wheeled tractor structure which may be hitched directly to the front end of a plow beam or cultivator tongue or beam, and steered by a person operating the plow, for drawing the plow and consequently eliminating the use of horses or other draft animals.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a section through the tractor, showing the same hitched to a turning or breaking plow; and Fig. 2 is a top plan view of the device.

Referring more particularly to the drawings, 1 indicates the supporting axle of the tractor which has a pair of propelling and supporting wheels 2 mounted thereon for rotation with the axle. The wheels 2 preferably have grouters or cleats carried by their peripheries for engagement with the ground to insure the propelling of the device and eliminate the liability of slipping or skidding. A suitable platform 4 is carried by the axle 1 and it has bearings 5 carried thereby in which the axle 1 rotates. An engine or motor bed plate 6 is mounted upon the platform 4 and it supports an ordinary internal combustion engine 7, of the gasolene type. The power or crank shaft 8 of the engine 7 is connected, through the medium of a gear 9 and a gear 10 to the axle 1 for rotating the axle upon the operation of the motor. The platform 4 supports a fuel retaining and supply tank 12, and also a radiator 14 which is connected by means of pipes 15 to the cooling system of the motor 6.

A clevis 16 is attached to the under surface of the platform 4 at the center of the rear edge of the same and it is connected through the medium of a king pin or bolt 17 to the front end of the beam 18 of an ordinary land turning or breaking plow 19. The clevis 16 may be attached to the beam of a cultivator, disk harrow or any suitable agricultural implement, without departing from the spirit of this invention.

The clevis 16 has a segmental rack 20 carried thereby with which a beveled gear 21 meshes. The gear 21 is mounted upon the forward end of a steering rod 22 which rod is supported by suitable bearings 23 from the beam 18 of the plow structure. A hand wheel 24 is mounted upon the rear end of the steering post 22 and it is positioned adjacent to the handle 25 of the plow structure so that the person operating the plow may steer the direction of travel of the tractor structure which is connected to the front end of the plow beam from the rear or manipulating end of the plow.

From the foregoing description taken in connection with the accompanying drawings, the advantages of construction and of the method of operation of the improved motor plow, will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

A structure for connecting an implement with a draft appliance comprising a forward clevis element adapted for rigid connection with a support, a segmental rack rigidly connected with and extending transversely of the rear end portion of the clevis element, a rear element having a forwardly extending tongue pivotally connected with the clevis element in advance of the rack, a rotatable shaft extending longitudinally of the rear element, and a gear carried by the shaft and engaging the teeth of the rack whereby rotation of the shaft will swing the rear element transversely of the clevis.

In testimony whereof I affix my signature in presence of two witnesses.

LOUSINDY F. WITHERSPOON.

Witnesses:
 DELL ROBINSON,
 MILTON ROACH.